United States Patent [19]

Wilkesmann

[11] 4,283,286

[45] Aug. 11, 1981

[54] CENTRIFUGE WITH PRODUCT ACCELERATOR

[75] Inventor: Helmut Wilkesmann, Munich, Fed. Rep. of Germany

[73] Assignee: Krauss-Maffei Aktiengesellschaft, Munich, Fed. Rep. of Germany

[21] Appl. No.: 112,459

[22] Filed: Jan. 16, 1980

[30] Foreign Application Priority Data

Jan. 17, 1979 [GB] United Kingdom ................. 2901643

[51] Int. Cl.[3] ................................................ B01D 33/02

[52] U.S. Cl. .................................... 210/365; 210/367; 210/377

[58] Field of Search .................... 210/213, 214, 360 R, 210/367, 371, 377, 380 R, 383

[56] References Cited

U.S. PATENT DOCUMENTS

| | | | |
|---|---|---|---|
| 403,910 | 5/1889 | Boyd | 210/377 X |
| 1,520,467 | 12/1924 | Frantz | 210/377 X |
| 1,829,547 | 10/1931 | Sharples | 210/377 X |
| 2,312,545 | 3/1943 | Haug | 210/377 X |
| 3,075,693 | 1/1963 | Dega | 210/360 A |
| 3,233,735 | 2/1966 | Hultsch et al. | 210/377 X |
| 4,153,551 | 5/1979 | Hultsch et al. | 210/367 X |
| 4,184,964 | 1/1980 | Hultsch | 210/367 X |

FOREIGN PATENT DOCUMENTS

| | | |
|---|---|---|
| 948409 | 8/1956 | Fed. Rep. of Germany . |
| 970399 | 9/1958 | Fed. Rep. of Germany . |
| 1197813 | 7/1965 | Fed. Rep. of Germany . |
| 2127458 | 12/1972 | Fed. Rep. of Germany . |
| 2459796 | 7/1976 | Fed. Rep. of Germany . |

*Primary Examiner*—Robert H. Spitzer

*Attorney, Agent, or Firm*—Karl F. Ross

[57] ABSTRACT

A centrifuge, preferably of the type having an upright axis, e.g. a wobble centrifuge, is provided with a distributor for the product to be centrifuged. The distributor, which is rotatable with the shaft, e.g. by being connected to the drum or basket or to the drive shaft proper, is formed with a circular array of ribs which are concave in the direction of rotation and form acute angles with a circle centered on the axis of the distributor along the inner portion of the array, thereby improving the distribution of the product to the drum and accelerating the product in the direction of rotation while directing it outwardly onto the drum.

11 Claims, 2 Drawing Figures

CENTRIFUGE WITH PRODUCT ACCELERATOR

FIELD OF THE INVENTION

My present invention relates to a centrifuge and, more particularly, to an improved product accelerator distributor for a centrifuge, especially a centrifuge having an upright axis and preferably a wobble centrifuge.

BACKGROUND OF THE INVENTION

Centrifuges having upright axes, especially wobble centrifuges are disclosed, for example, in German patent publication (Open Application—Offenlegungsschrift) DE-OS No. 24 59 796 and in other literature to be mentioned below. This publication, in particular, refers to a product accelerator or distributor coupled with the centrifuge drum, aligned with the source of the product to be centrifuged, adapted, because of the arrangement of openings, to uniformly spread the product upon the interior of the centrifuge drum.

This accelerator has the additional purpose of imparting a rotary movement to the product in the direction of drum rotation so as to conform the rotary velocity at least in part to the rotational speed of the drum, the product entering from the axially aligned or coaxial inlet with practically no rotational component.

Reference may also be had to U.S. Pat. No. 4,153,551 issued May 8, 1979 and the publications and references listed therein, to the publications and references listed in the aforementioned German patent document, namely, U.S. Pat. No. 2,676,707, French Pat. No. 1,094,409, German patent document (Open Application—Offenlegungsschrift) DT-OS No. 23 36 922 and German patent document (Printed Application—Auslegeschrift) DT-AS No. 21 26 069.

In the system of German patent document DE-OS No. 24 59 796, the lateral openings in the distributor or product accelerator are generally formed between flanks which are substantially radial.

Experience has shown that while this system is highly effective, nevertheless problems arise when the product is highly abrasive. In such cases the abrasive wear of these surfaces can destroy them, especially when considerable force or torque must be applied to the product, i.e. the product density or viscosity is high.

A particular problem of this kind can be noted when the system of German patent document (Open Application—Offenlegungsschrift) DE-OS 21 27 458 which provides a wobble centrifuge with a distributor associated with the drum in FIG. 3.

In this system especially the high dynamic forces, coupled with the abrasive war of the ribs brings about a significant deterioration of the distributor and/or breakage thereof under certain conditions.

It is self-understood that such breakage must be avoided at all cost since damage to the product accelerator or distributor may endanger the entire unit and certainly renders the unit inoperative.

Consequently, with prior art centrifuges having product accelerators or distributors of the type described, frequent and periodic maintenance is required to monitor wear of the surfaces and the mechanical stability of the accelerator. When such wear is noted, the distributor is removed and replaced, frequently a time-consuming operation.

An alternative approach utilizes preventive maintenance by replacing the distributor after a given number of operating hours, also an expensive and time-consuming proposition.

The problem is complicated by the fact that frequently the distributing or accelerator surfaces of the distributor are not visible from the exterior and hence the machine must be shut down and generally disassembled, at least in part, even for inspection.

Similar problems are encountered with the systems described in German Pat. Nos. 948,409; 970,399 and 1,197,813.

OBJECTS OF THE INVENTION

It is the principal object of the present invention to provide, in a centrifuge for the separation of components of a product, an improved product distributor for uniformly depositing the product upon the centrifuge drum and for imparting a rotary component to the velocity of this product as it is deposited upon the drum, whereby the disadvantages of the earlier systems mentioned above and otherwise can be eliminated.

Another object of my present invention is to provide an improved centrifuge which has reduced downtime and better surface life than has been possible for similar centrifuges of the prior art.

It is also an object of this invention to reduce the need for monitoring wear of the effective surfaces of the product distributor for centrifuges having upright axes.

A further object of the invention is to provide a product distributor and accelerator for wobble and other centrifuges having upright axes in which wear of the effective surfaces can be more easily monitored, which facilitates replacement of the distributor, and which is less affected by dynamic forces than earlier systems.

SUMMARY OF THE INVENTION

These objects and others which will become apparent hereinafter are attained, in accordance with the invention, in a centrifuge having a housing, a centrifuge drum rotatable in this housing about at least one upright axis (the centrifuge being of the fixed-axis or of the wobble type), at least one drive shaft rotatable in the housing and operatively connected to the drum for rotating same, drive means connected to this drive shaft and displacing both the shaft and the drum so as to cause a product to be centrifuged in the drum, an inlet for this product opening along or parallel to this axis and extending into the housing, and a distributor operatively connected to the shaft (e.g. directly or via the drum) and positioned to intercept the product introduced at the inlet for distributing the product uniformly onto the drum.

According to the invention, the distributor is formed with a circular array of angularly equispaced scoop-shaped ribs or vanes accelerating the product in the direction of rotation of the drum and distributor and radially directing the product outwardly onto the interior of the drum. The ribs have product-displacing surfaces (facing in the direction of rotation) which are of concave curvature and extend radially inwardly to include acute angles with a circle centered on the axis of the distributor and pointing in the direction of rotation. Advantageously, each rib widens outwardly from an apex at the point of this angle and has a curved rear flank which is convex.

The scoop-shaped configuration of the ribs, as thus defined, provides a relatively small attack angle of the innermost edges formed by the above-mentioned vertex of the acute angle and thereby minimizes wear along the inlet portion of the surface, i.e. that portion of the concave surface which first encounters the product and lies at the interior of the outwardly extending slots formed between the ribs.

Naturally, with time, the tips of the ribs will wear away, thereby greatly changing the angle of attack and reducing the product output.

When, however, the wear is such that the product output is significantly reduced, a phenomenon which can be monitored readily, e.g. by optical or acoustic means, the distributor can be partly or completely replaced with ease. Of course, since the cross section of ribs increases progressively outwardly, the wear is generally confined to the aforementioned tips so that the distributor has a long useful life.

According to a feature of the invention, the blades or ribs are members separate from the disk of the distributor to which they are attached and can be removed and replaced individually. Advantageously the ribs may be provided with bores traversed by bolts which can also serve to mount the drum upon the distributor.

Advantageously, and in accordance with another embodiment of the invention, the curvature of the forward surface extends to the outer edge of the rib.

It has been found to be desirable, moreover, to provide the forward surface of each rib and the juxtaposed right flank of the next rib with such curvatures that the slot or channel between adjacent ribs is of constant cross section and uniform shape over the entire radial extent of the slot.

BRIEF DESCRIPTION OF THE DRAWING

The above and other objects, features and advantages of the present invention will be more readily apparent from the following description, reference being made to the accompanying drawing in which.

SPECIFIC DESCRIPTION

Figure 1:
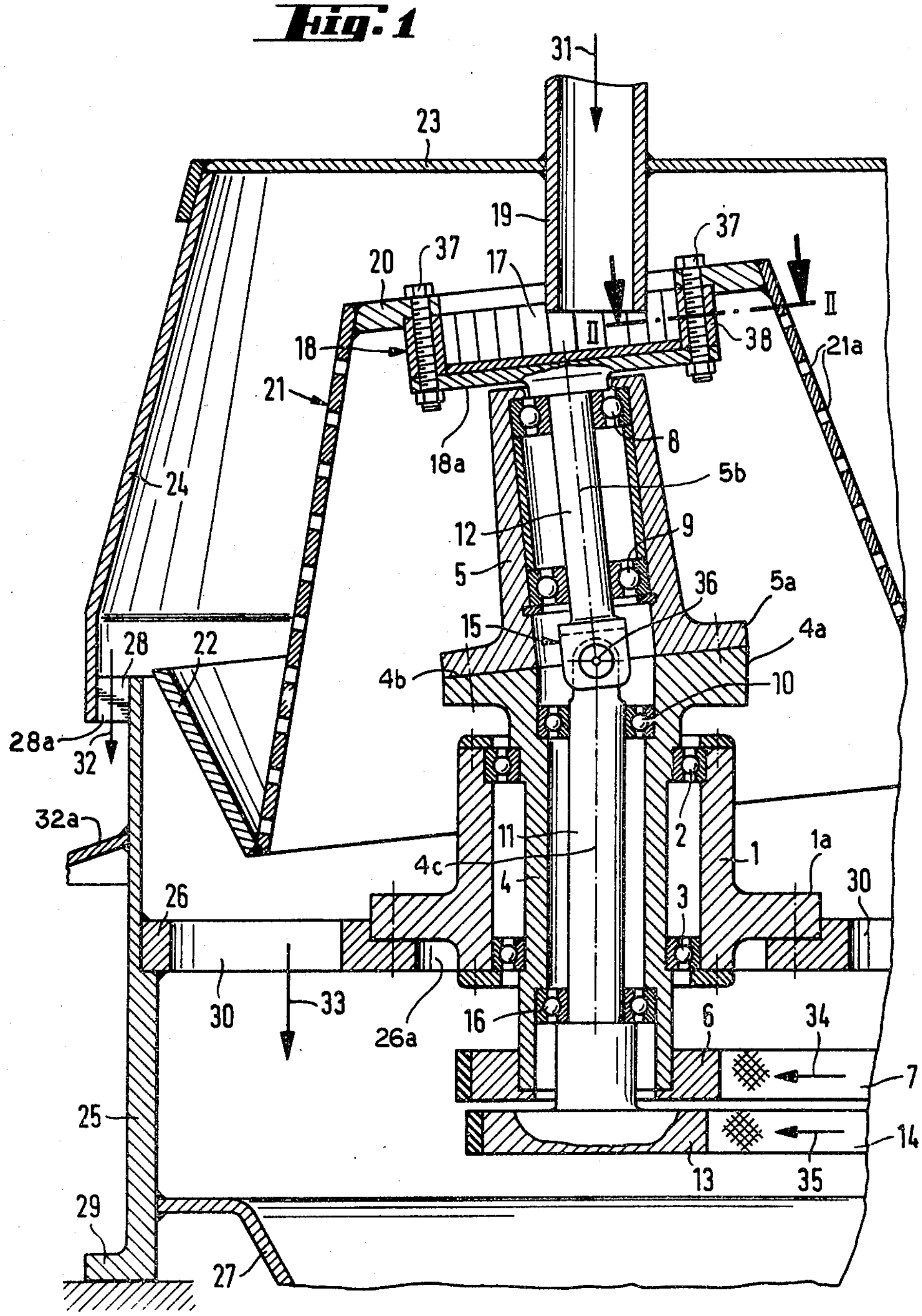
FIG. 1 is a partial diagrammatic vertical axial cross-sectional view of a centrifuge according to the present invention.

In FIG. 1 I have shown a centrifuge in which the housing or support comprises a bearing-mounting sleeve 1 in which an outer shaft 4 is journaled by a pair of bearings 2 and 3. Shaft 4 provided at its upper end with a flange 4*a* whose upper surface 4*b* is inclined to the vertical axis 4*c* of the hollow shaft 4. The lower end of shaft 4 is provided with a pulley 6 engaged by a belt 7 connected to a drive motor (see U.S. Pat. No. 4,153,551).

At its upper end, the flange 4*a* is bolted to a flange 5*a* of a hollow shaft 5 which is thus canted with respect to the axis 4*c* and has an axis 5*b*.

An inner shaft 11, keyed to the pulley 13, driven by bolt 14 from the same or another drive motor, is journaled by bearings 10 and 16 in the hollow shaft 4 and is connected by a universal or cardan joint 15 to the inner shaft 12. The latter is journaled by bearings 8 and 9 in the hollow shaft 5 and carries a disk 18*a* forming the support for the product distributor 18.

The pivot center 36 of the universal joint 15 is disposed in the plane of the interface between the flanges 4*a* and 5*a*.

Above the inner shaft end, a radially extending flow passage 17 is provided in the upwardly open product accelerator 18. Into this opening or passage extends an inlet pipe 19 which can be generally aligned along the axis 4*c*.

The housing is provided with a removable cover 23 traversed by the inlet pipe 19.

The product accelerator 18 is connected by bolts 37 with an annular disk 20 forming the upper end of a downwardly widening frustoconical centrifuge drum 21 provided with perforations 21*a* through which the liquid phase of the slurry forming the product may be discharged (see, e.g. U.S. Pat. No. 4,153,551).

The lower end of this drum is provided along its exterior with a frustoconical upwardly diverging collecting apron 22.

The housing also includes a downwardly frustoconical upper housing portion 24 carrying the cover 23 and affixed to the lower housing part 25 mounted by feet 29 upon a foundation. The connection between the upper and lower portions of the housing is effected by plates 28 which provide passages 28*a* between them.

At a level of approximately half the height of the lower housing portion 25, a bottom plate 26 is welded, this plate having a central opening 26*a* in which the bearing sleeve 1 is received. The bearing sleeve 1 has a flange 1*a* bolted to the plate 26 which is formed outwardly of the bearing sleeve with throughgoing openings 30.

The centrifuge as described is of the wobble type operating with the principles of the wobble centrifuges of the prior art mentioned previously.

More specifically, the slurry is introduced through the inlet tube 19 in the direction of arrow 31 and is accelerated and distributed by the distributor 18 onto the interior of the drum 21. Centrifugal operation forces the liquid through the perforations 21*a* where it is collected by the upper housing portion 24 or the apron 22 and traverses the positions 28*a* between the ribs 28 to flow in the direction of arrow 32, guided by an apron 32*a*.

The solids are thrown from the lower end of the drum and pass in the direction of arrow 33 into a collecting funnel or hopper 27.

The displacement of the solids is effected as a result of the wobble movement generated by rotating the shafts 4,5 and the shafts 11,12 with a speed difference such that the wobble impulse attains the friction angle of the solids or exceeds the friction angle thereof.

This can be achieved by driving the pulley 6 and 13 at the same peripheral speeds or only slightly different peripheral speeds in view of the difference in diameter of these pulleys, i.e. the belts 7 and 14, driven as represented by arrows 34 and 35, can be driven by a common shaft.

Figure 2:
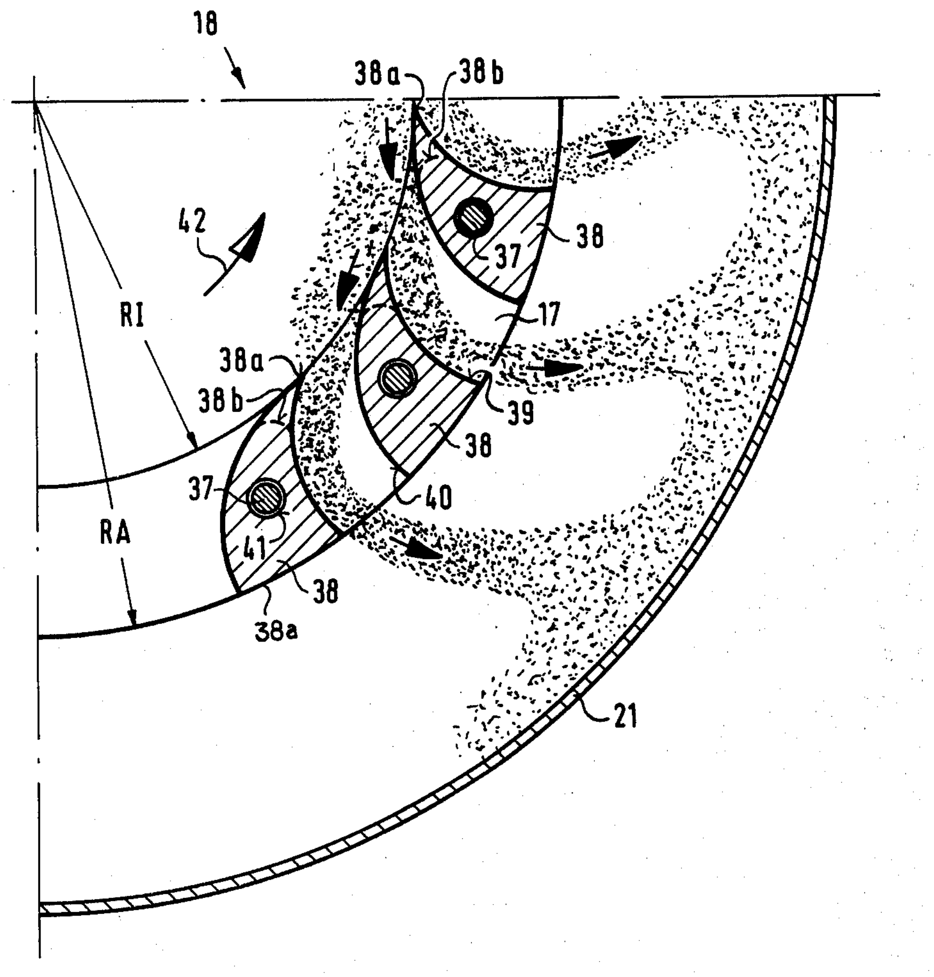
FIG. 2 is a partial section taken along the line II—II of FIG. 1 diagrammatically illustrating the distribution of the product upon the drum.

The product accelerator 18 is shown in greater detail in FIG. 2 and comprises a circular array of blades or ribs 28 which are concave forwardly and convex rearwardly with respect to the direction of rotation.

At their radially innermost region, at a circle of a radius RI each rib has a vertex or apex and from this apex diverges outwardly between a forward surface 49 and a rear flank 40, these surfaces including progressively increasing angles between them outwardly.

Surface 49 is concave, and surface 40 is convex, both of constant curvature. At the radius RA the ribs 38 are at their widest, the ribs in this region lying along the circle of radius RA. This can be seen from FIG. 2 as well, the central regions of the ribs 38, of significant width, are formed with bores 41 traversed by the bolts 37 by means of which the individual ribs are anchored to the plate 18*a* replaceably and also serving to attach the drum 21 to the distributor 18.

Thus the ribs are individually replaceable readily and can be positioned without difficulty by aligning their outermost faces 38*a* with the circumference of the plate 18*a*.

The surfaces 39 form acute angles with the circle of radius RI and with the respective rear flanks 40.

The radial passages 17 are provided between the individual ribs 38, these passages being of constant width and cross-sectional area and shaped radially outwardly.

As can be seen from FIG. 2 the centrally supplied product is captured by the tips 38*a* upon rotation of the distributor and is radially outwardly displaced with a velocity in the direction of rotation which increases from practically zero to an annular velocity equal to that of the drum 21 in the region of the outermost edge of the surfaces 39 before the product particles are cast against the drum. Wear is minimized when the particles receive the same annular velocity as the drum. This has been found to be the case when the surface 39 includes an acute angle with the circle of radius RA pointing in the direction of rotation 42 although this angle need not be as small as the attack angle. The peripheral velocity of the product as it leaves the distributor is thus greater than the peripheral speed of the distributor itself.

It is advantageous to provide the ribs or blades of a wear-resistant material such as hard-surfaced metal, hard metal such as titanium or tungsten containing steels and sintered ceramics.

Nevertheless some wear results too around the tips 38*a* as shown by the broken lines 38*b*.

Such rounding, or be it at an extremely low rate, results in a decrease in the product throughput which can be monitored and the blades or ribs replaced without any damage to the mounting of the blades by such wear. Parts of the distributor, therefore, cannot break away.

It has already been mentioned that the blades can be replaced individually, because of the unique mounting system. It can also be noted that the mounting system applies only compressing forces to the hard metal ribs which cannot readily sustain tension. Even in the case in which the throughput drop is not immediately noted, no damage to the centrifuge can occur. The product accelerator of the present invention need not be in the force transmission path between the drive shaft and the drum but can be rotated by other means.

I claim:

1. In a centrifuge having a housing, a centrifuge drum rotatable in said housing, a drive shaft rotatable in said housing, and operatively connected to said drum, drive means connected to said drive shaft for rotating same to cause a product to be centrifuged in said drum, and inlet opening into said housing for delivering said product to said drum, and a distributor operatively connected to said drive shaft for receiving said product from said inlet and distributing said product uniformly onto said drum, the improvement wherein:

said distributor is disposed between said drive shaft and said drum and comprises a circular array of angularly equispaced scoop-shaped ribs forming blades accelerating said product in the direction of rotation of said drum and radially directing said product onto the interior of said drum, said ribs having progressively decreasing thicknesses inwardly, said ribs having product displacing surfaces of concave curvature extending radially inwardly and including respective acute angles with a circle centered on the axis of said array and pointing in the direction of rotation along the inner part of said array, said drum being connected by the product-accelerating distributor to said drive shaft, said ribs having front and rear surfaces with respect to said direction terminating at a common edge at said circle.

2. The improvement defined in claim 1 wherein said distributor further comprises a support disk, each of said ribs being attached to said support disk by a respective bolt.

3. The improvement defined in claim 2 wherein said drum is mounted on said ribs by said bolts.

4. The improvement defined in claim 3 wherein each of said ribs is formed in a central region thereof with a throughgoing bore traversed by the respective bolt.

5. The improvement defined in claim 1 wherein each of said rear surface is curved and convex.

6. The improvement defined in claim 1 wherein each of said surfaces includes an acute angle with a circle extending along the outermost portion of said array and centered at the center of said array, the last-mentioned acute angle pointing in the direction of rotation of the distributor.

7. The improvement defined in claim 1 wherein said ribs define between them outwardly extending slots of substantially constant cross section and shape.

8. The improvement defined in claim 1, claim 2, claim 3, claim 4, claim 5, claim 6 or claim 7 wherein said drum is mounted on said distributor and is connected by said distributor to said shaft, said shaft comprising an upper shaft connected by a universal joint with a lower shaft, said centrifuge comprising a hollow shaft having upper and lower parts respectively journaling said upper and lower shafts therebetween, means for canting said upper but relative to said lower part, and means for driving said hollow shaft in an angular velocity different from the angular velocity of said upper and lower shafts.

9. In a centrifuge having a housing, a centrifuge drum rotatable in said housing, a drive shaft rotatable in said housing, and operatively connected to said drum, drive means connected to said drive shaft for rotating same to cause a product to be centrifuged in said drum, an inlet opening into said housing for delivering said product to said drum, and a distributor operatively connected to said drive shaft for receiving said product from said inlet and distributing said product uniformly onto said drum, the improvement wherein:

said distributor comprises a circular array of angularly equispaced scoop-shaped ribs accelerating said product in the direction of rotation of said drum and radially directing said product onto the interior of said drum, said ribs having product-displacing surfaces of concave curvature extending radially inwardly and including respective acute angles with a circle centered on the axis of said array and pointing in the direction of rotation along the inner part of said array, said distributor comprising a support disk, each of said ribs being attached to said support disk by a respective bolt, said drum being mounted on said ribs by said bolts.

10. The improvement defined in claim 9 wherein each of said ribs widens outwardly and is formed in a central region thereof with a throughgoing bore traversed by the respective bolt.

11. The improvement defined in claim 9 or claim 10 wherein said drum is mounted on said distributor and is connected by said distributor to said shaft, said shaft comprising an upper shaft connected by a universal joint with a lower shaft, said centrifuge comprising a hollow shaft having upper and lower parts respectively journaling said upper and lower shafts therebetween, means for canting said upper part relative to said lower part, and means for driving said hollow shaft at an angular velocity different from the angular velocity of said upper and lower shafts.

* * * * *